US012639634B2

(12) United States Patent
Kanter et al.

(10) Patent No.: US 12,639,634 B2
(45) Date of Patent: **\*May 26, 2026**

(54) SYSTEM AND METHOD OF OPERATIONALIZING AUTOMATED FEATURE ENGINEERING

(71) Applicant: Alteryx, Inc., Irvine, CA (US)

(72) Inventors: James Max Kanter, Boston, MA (US); Kalyan Kumar Veeramachaneni, Watertown, MA (US)

(73) Assignee: Alteryx, Inc., Irvine, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/963,024

(22) Filed: Nov. 27, 2024

(65) Prior Publication Data

US 2025/0086519 A1 Mar. 13, 2025

Related U.S. Application Data

(63) Continuation of application No. 18/583,205, filed on Feb. 21, 2024, now Pat. No. 12,190,218, which is a
(Continued)

(51) Int. Cl.
*G06N 20/00* (2019.01)
*G06F 16/2457* (2019.01)
*G06F 16/28* (2019.01)

(52) U.S. Cl.
CPC ....... *G06N 20/00* (2019.01); *G06F 16/24578* (2019.01); *G06F 16/285* (2019.01)

(58) Field of Classification Search
CPC .. G06F 16/24578; G06F 16/285; G06N 20/00
See application file for complete search history.

(56) References Cited

U.S. PATENT DOCUMENTS 5,182,708 A * 1/1993 Ejiri ...................... G06F 40/247
704/1
5,371,807 A * 12/1994 Register ................ G06F 16/353
707/E17.09
(Continued)

FOREIGN PATENT DOCUMENTS

WO 2019090023 A1 5/2019

OTHER PUBLICATIONS

Gangemi, 2018, Springer, pp. 128-144.*
(Continued)

*Primary Examiner* — Michael I Ezewoko
(74) *Attorney, Agent, or Firm* — FIG. 1 Patents

(57) ABSTRACT

A feature engineering tool automatically generates a group of features for generating a machine learning model. The feature engineering tool selects primitives for a dataset and synthesizes a plurality of features based on the selective primitives and the dataset. The feature engineering tool iteratively applies the plurality of features to a different portion of the dataset to evaluate usefulness of the plurality of features. Based on the evaluation, it removes some of the plurality of features to obtain the group of features. The feature engineering tool also determines the importance factor for each feature in the group. The machine learning model is generated based on the features and their importance factors and can be used to make a prediction based on new data.

20 Claims, 6 Drawing Sheets

Related U.S. Application Data continuation of application No. 17/039,428, filed on Sep. 30, 2020, now Pat. No. 11,941,497.

(56) References Cited

U.S. PATENT DOCUMENTS

| | | | | |
|---|---|---|---|---|
| 6,192,360 | B1 * | 2/2001 | Dumais | G06F 16/353 |
| | | | | 2/5 |
| 7,366,705 | B2 * | 4/2008 | Zeng | G06F 16/355 |
| | | | | 706/20 |
| 7,580,742 | B2 * | 8/2009 | Tan | G06F 3/015 |
| | | | | 600/544 |
| 7,689,531 | B1 * | 3/2010 | Diao | G06N 20/00 |
| | | | | 706/62 |
| 7,711,673 | B1 * | 5/2010 | Diao | G06F 40/126 |
| | | | | 706/62 |
| 7,853,599 | B2 * | 12/2010 | Liu | G06F 16/334 |
| | | | | 707/754 |
| 8,023,974 | B1 * | 9/2011 | Diao | G06F 18/2411 |
| | | | | 709/200 |
| 8,095,521 | B2 * | 1/2012 | Chan | G06Q 30/02 |
| | | | | 707/705 |
| 8,498,986 | B1 * | 7/2013 | Botros | G06F 16/285 |
| | | | | 707/737 |
| 8,560,466 | B2 * | 10/2013 | Diao | G06N 20/00 |
| | | | | 706/12 |
| 8,655,803 | B2 * | 2/2014 | Lecerf | G06V 30/1452 |
| | | | | 706/12 |
| 9,171,057 | B2 * | 10/2015 | Botros | G06F 16/285 |
| 9,189,750 | B1 * | 11/2015 | Narsky | G06F 16/285 |
| 9,249,287 | B2 * | 2/2016 | Muraoka | C08J 3/226 |
| 9,292,493 | B2 * | 3/2016 | Chandramouli | H04L 63/1416 |
| 9,524,469 | B1 * | 12/2016 | Mathew | G06N 5/02 |
| 9,552,393 | B2 * | 1/2017 | Botros | G06F 16/2457 |
| 9,645,999 | B1 * | 5/2017 | Ciulla | G06F 16/35 |
| 9,715,495 | B1 * | 7/2017 | Tacchi | G06F 40/30 |
| 9,740,368 | B1 * | 8/2017 | Love | G06F 3/04817 |
| 9,787,705 | B1 * | 10/2017 | Love | G06F 16/9024 |
| 9,836,183 | B1 * | 12/2017 | Love | G06F 16/904 |
| 9,911,211 | B1 * | 3/2018 | Damaraju | G06T 11/26 |
| 9,996,800 | B2 * | 6/2018 | Mathew | G06Q 30/0241 |
| 10,318,669 | B2 * | 6/2019 | Freeman | G06Q 30/0201 |
| 10,325,212 | B1 * | 6/2019 | Paliwal | G06N 5/04 |
| 10,467,533 | B2 * | 11/2019 | Kumar | G06N 5/022 |
| 10,482,118 | B2 * | 11/2019 | Zheng | G06N 20/00 |
| 10,504,035 | B2 * | 12/2019 | Shteingart | G06N 20/00 |
| 10,885,463 | B2 * | 1/2021 | Hansen | G06N 20/00 |
| 10,963,806 | B2 * | 3/2021 | Mathew | G06Q 30/0241 |
| 11,087,088 | B2 * | 8/2021 | Chatterjee | G06F 40/30 |
| 11,257,000 | B2 * | 2/2022 | Mathew | H04W 4/021 |
| 11,429,899 | B2 * | 8/2022 | Kartoun | G06N 20/00 |
| 11,538,314 | B2 | 12/2022 | Chen | |
| 11,568,314 | B2 * | 1/2023 | Wan | G06F 12/0871 |
| 11,636,367 | B2 * | 4/2023 | Manouchehri | G06Q 30/0241 |
| | | | | 706/52 |
| 11,663,280 | B2 * | 5/2023 | Ahmadvand | G06F 16/9535 |
| | | | | 707/708 |
| 11,693,637 | B1 * | 7/2023 | Singh | G06F 8/436 |
| | | | | 717/139 |
| 11,698,205 | B2 * | 7/2023 | Brown | G06Q 30/018 |
| | | | | 700/276 |
| 11,727,284 | B2 * | 8/2023 | Le Biannic | G06N 20/00 |
| | | | | 706/12 |
| 12,190,218 | B2 | 1/2025 | Kanter et al. | |
| 2003/0101181 | A1 * | 5/2003 | Al-Kofahi | G06F 16/353 |
| 2003/0208399 | A1 * | 11/2003 | Basak | G06Q 30/02 |
| | | | | 705/14.67 |
| 2009/0282012 | A1 * | 11/2009 | Konig | G06F 40/295 |
| | | | | 707/999.005 |
| 2010/0150448 | A1 * | 6/2010 | Lecerf | G06F 18/253 |
| | | | | 382/190 |
| 2010/0185568 | A1 * | 7/2010 | Bates | G06N 20/00 |
| | | | | 707/E17.014 |
| 2011/0213655 | A1 * | 9/2011 | Henkin | G06Q 30/00 |
| | | | | 707/E17.061 |
| 2011/0224913 | A1 * | 9/2011 | Cui | G16B 20/00 |
| | | | | 702/19 |
| 2012/0278263 | A1 * | 11/2012 | Borthwick | G06N 20/00 |
| | | | | 706/12 |
| 2013/0097103 | A1 * | 4/2013 | Chari | G06N 20/10 |
| | | | | 707/E17.089 |
| 2013/0184538 | A1 * | 7/2013 | Lee | A61B 5/4205 |
| | | | | 600/301 |
| 2013/0185306 | A1 * | 7/2013 | Botros | G06F 16/2457 |
| | | | | 707/E17.084 |
| 2013/0198187 | A1 * | 8/2013 | Botros | G06F 16/285 |
| | | | | 707/E17.069 |
| 2013/0304740 | A1 * | 11/2013 | Botros | G06Q 10/00 |
| | | | | 707/737 |
| 2014/0228714 | A1 * | 8/2014 | Chau | A61B 5/7267 |
| | | | | 600/593 |
| 2014/0236941 | A1 * | 8/2014 | Johns | G06F 16/93 |
| | | | | 707/730 |
| 2014/0337820 | A1 * | 11/2014 | Km | G06F 11/3692 |
| | | | | 717/123 |
| 2016/0147891 | A1 * | 5/2016 | Chhichhia | G06F 16/986 |
| | | | | 707/734 |
| 2017/0185902 | A1 * | 6/2017 | Kumar | G06N 20/00 |
| 2018/0000403 | A1 * | 1/2018 | Chau | A61B 5/7267 |
| 2018/0018585 | A1 * | 1/2018 | Marin | G06N 20/00 |
| 2018/0039911 | A1 * | 2/2018 | Bezzubtseva | G06N 20/00 |
| 2018/0052932 | A1 * | 2/2018 | Catalano | G06Q 30/0625 |
| 2018/0365248 | A1 * | 12/2018 | Zheng | G06F 40/216 |
| 2019/0108276 | A1 * | 4/2019 | Kovács | G06F 16/243 |
| 2019/0236206 | A1 * | 8/2019 | Chowdhury | G06F 40/242 |
| 2019/0377784 | A1 * | 12/2019 | King | G06F 18/2132 |
| 2020/0079545 | A1 | 3/2020 | Soehnlen et al. | |
| 2020/0082810 | A1 * | 3/2020 | Kneller | G06N 5/047 |
| 2020/0097545 | A1 | 3/2020 | Chatterjee et al. | |
| 2020/0311576 | A1 * | 10/2020 | Yamaguchi | G06N 20/10 |
| 2021/0110208 | A1 * | 4/2021 | Ahmadvand | G06N 3/08 |
| 2022/0253725 | A1 * | 8/2022 | Feng | G06N 20/00 |
| 2024/0193485 | A1 | 6/2024 | Kanter et al. | |

OTHER PUBLICATIONS

Kurkova, Springer, 2018, pp. 1-846.*

"Notice of Allowance", U.S. Appl. No. 18/583,205, filed Sep. 5, 2024, 21 pages.

"Examination Report", Australian Application No. 2021353828, Jul. 4, 2023, 3.

Gangemi, et al., "The Semantic Web", 15th International Conference, ESWC 2018, Heraklion, Crete, Greece, Jun. 2018, 22 pages.

Kanter, Max, "Feature Engineering: Secret to Data Science Success", retrieved from <<https://community.alteryx.com/t5/Data-Science/Feature-Engineering-Secret-to-Data-Science-Success/ba-p/545041>>, Mar. 23, 2000, 5 pages.

Koehrsen, Will, "Why Automated Feature Engineering Will Change the Way You Do Machine Learning", retrieved from <<https://innovation.alteryx.com/why-automated-feature-engineering-will-change-the-way-you-do-machine-learning/>>, Nov. 4, 2020, 11 pages.

Kůrková, et al., "Artificial Neural Networks and Machine Learning—ICANN 2018", 27th International Conference on Artificial Neural Networks, Rhodes, Greece, Proceedings Part III (1 of 2), Oct. 2018, 866 pages.

Kůrková, et al., "Artificial Neural Networks and Machine Learning—ICANN 2018", 27th International Conference on Artificial Neural Networks, Rhodes, Greece, Proceedings Part III (2 of 2), Oct. 2018, 866 pages.

"International Search Report", PCT Application No. PCT/US2021/050752, Dec. 27, 2021, 2 pages.

Primitives, "Age", Version 1.20.0 retrieved from <<http://primitives.featurelabs.com/#Age>>, Nov. 4, 2020, 1 pages.

Schreck, Ben, "Feature Engineering vs Feature Selection", Retrieved

(56) References Cited

OTHER PUBLICATIONS from <<https://innovation.alteryx.com/feature-engineering-vs-feature-selection/>>, Jan. 4, 2018, 11 pages.

* cited by examiner

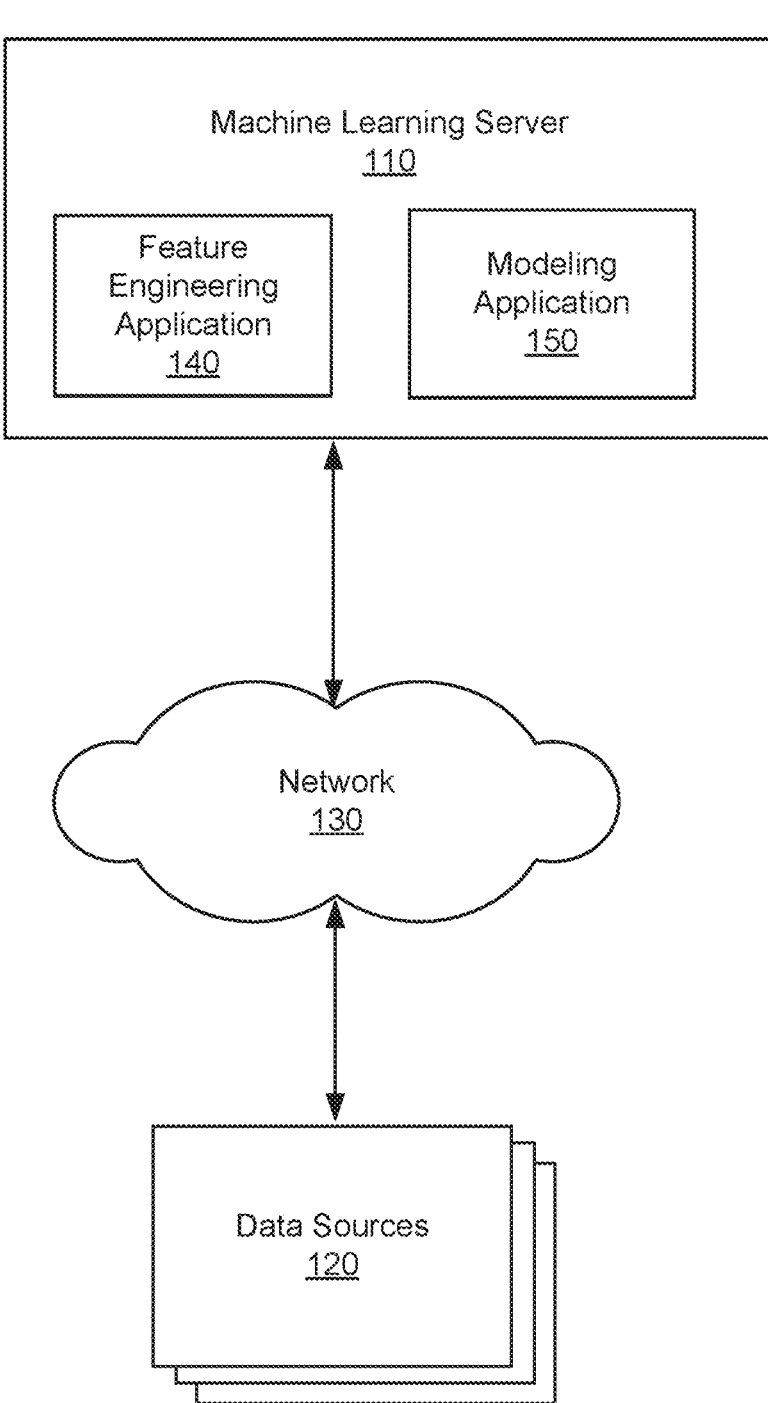
FIG. 1

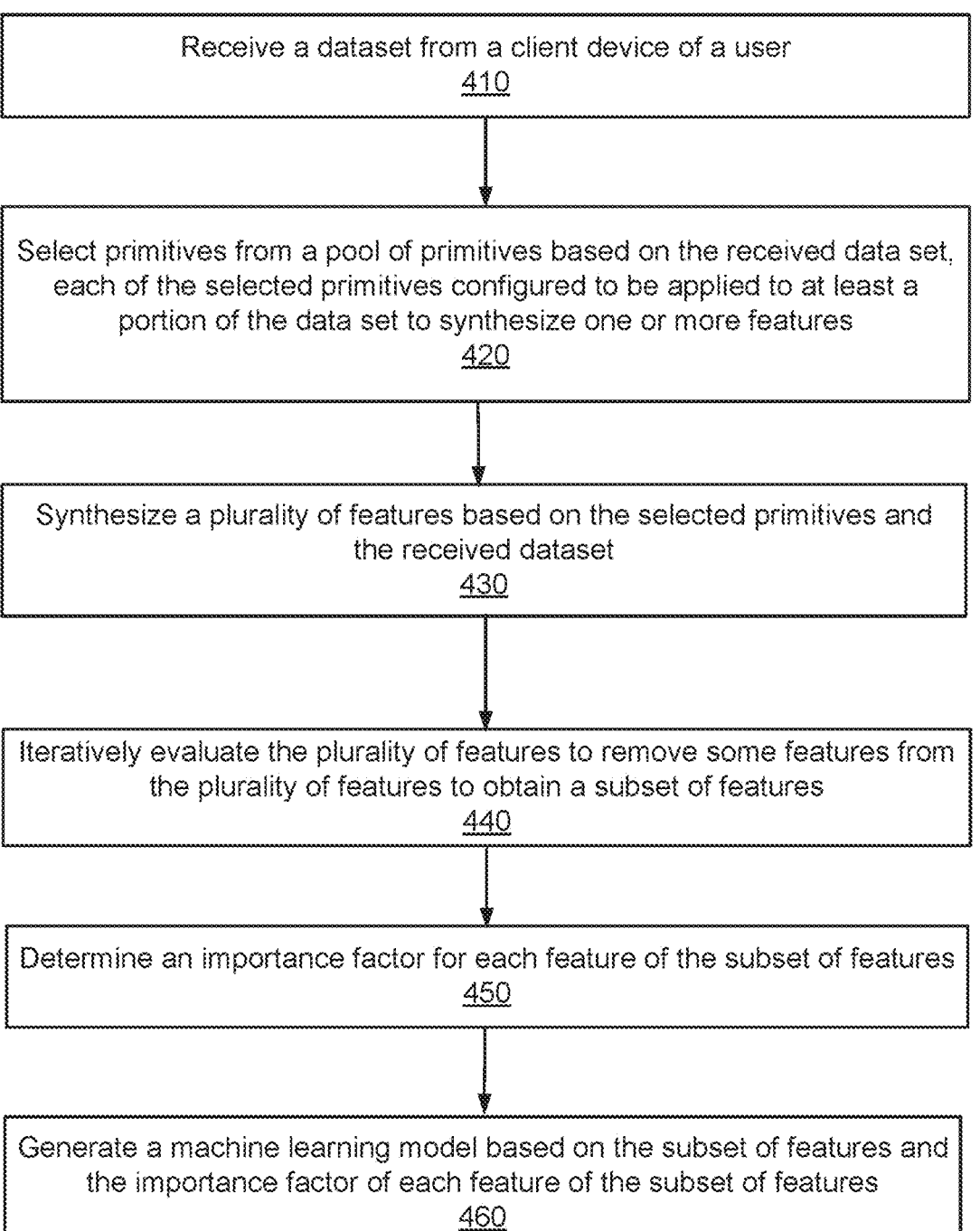

400

Receive a dataset from a client device of a user
410

Select primitives from a pool of primitives based on the received data set, each of the selected primitives configured to be applied to at least a portion of the data set to synthesize one or more features
420

Synthesize a plurality of features based on the selected primitives and the received dataset
430

Iteratively evaluate the plurality of features to remove some features from the plurality of features to obtain a subset of features
440

Determine an importance factor for each feature of the subset of features
450

Generate a machine learning model based on the subset of features and the importance factor of each feature of the subset of features
460

Train a model based on features and importance factors of the features
510

Receive a dataset from a data source associated with an enterprise
520

Obtain values of the features from the received dataset
530

Input the values of the features to the trained model, the trained model
outputting a prediction
540

SYSTEM AND METHOD OF OPERATIONALIZING AUTOMATED FEATURE ENGINEERING

CROSS-REFERENCE TO RELATED APPLICATIONS

This application is a continuation of U.S. patent application Ser. No. 18/583,205, filed Feb. 21, 2024, which is a continuation of U.S. application Ser. No. 17/039,428, filed Sep. 30, 2020, the disclosures of which are hereby incorporated by reference in their entireties.

BACKGROUND

Field of Art

The described embodiments pertain in general to processing data streams, and in particular to engineering features useful for performing machine learning on data in the streams.

Description of the Related Art

Feature engineering is the process of identifying and extracting predictive features in complex data typically analyzed by businesses and other enterprises. Features are key to the accuracy of prediction by machine learning models. Therefore, feature engineering is often the determining factor in whether a data analytics project is successful. Feature engineering is usually a time-consuming process. With currently available feature engineering tools, an entirely new feature engineering pipeline has to be built for every data analytics project as it is difficult to reuse previous work. Also, currently available feature engineering tools usually require a large amount of data to achieve good prediction accuracy. Thus, the current feature engineering tools fail to efficiently serve data processing needs of enterprises.

SUMMARY

The above and other issues are addressed by a method, computer-implemented data analytics system, and computer-readable memory for processing data blocks in a data analytics system. An embodiment of the method includes receiving a dataset from a data source. The method further includes selecting primitives from a pool of primitives based on the received dataset. Each of the selected primitives is configured to be applied to at least a portion of the dataset to synthesize one or more features. The method further includes synthesizing a plurality of features by applying the selected primitives to the received dataset. The method further includes iteratively evaluating the plurality of features to remove some features from the plurality of features to obtain a subset of features. Each iteration includes evaluating usefulness of at least some features of the plurality of features by applying a different portion of dataset to the evaluated features and removing some of the evaluated features based on the usefulness of the evaluated features to produce the subset of features. The method also includes determining an importance factor for each feature of the subset of features. The method also includes generating a machine learning model based on the subset of features and the importance factor of each feature of the subset of features. The machine learning model is configured to be used to make a prediction based on new data.

An embodiment of the computer-implemented data analytics system includes a computer processor for executing computer program instructions. The system also includes a non-transitory computer-readable memory storing computer program instructions executable by the computer processor to perform operations. The operations include receiving a dataset from a data source. The operations further include selecting primitives from a pool of primitives based on the received dataset. Each of the selected primitives is configured to be applied to at least a portion of the dataset to synthesize one or more features. The operations further include synthesizing a plurality of features by applying the selected primitives to the received dataset. The operations further include iteratively evaluating the plurality of features to remove some features from the plurality of features to obtain a subset of features. Each iteration includes evaluating usefulness of at least some features of the plurality of features by applying a different portion of dataset to the evaluated features and removing some of the evaluated features based on the usefulness of the evaluated features to produce the subset of features. The operations also include determining an importance factor for each feature of the subset of features. The operations also include generating a machine learning model based on the subset of features and the importance factor of each feature of the subset of features. The machine learning model is configured to be used to make a prediction based on new data.

An embodiment of the non-transitory computer-readable memory stores executable computer program instructions. The instructions are executable to perform operations. The operations include receiving a dataset from a data source. he operations further include selecting primitives from a pool of primitives based on the received dataset. Each of the selected primitives is configured to be applied to at least a portion of the dataset to synthesize one or more features. The operations further include synthesizing a plurality of features by applying the selected primitives to the received dataset. The operations further include iteratively evaluating the plurality of features to remove some features from the plurality of features to obtain a subset of features. Each iteration includes evaluating usefulness of at least some features of the plurality of features by applying a different portion of dataset to the evaluated features and removing some of the evaluated features based on the usefulness of the evaluated features to produce the subset of features. The operations also include determining an importance factor for each feature of the subset of features. The operations also include generating a machine learning model based on the subset of features and the importance factor of each feature of the subset of features. The machine learning model is configured to be used to make a prediction based on new data.

BRIEF DESCRIPTION OF DRAWINGS

FIG. 1 is a block diagram illustrating a machine learning environment including a machine learning server according to one embodiment.

FIG. 4 is a flow chart illustrating a method of generating a machine learning model according to one embodiment.

Figure 2:
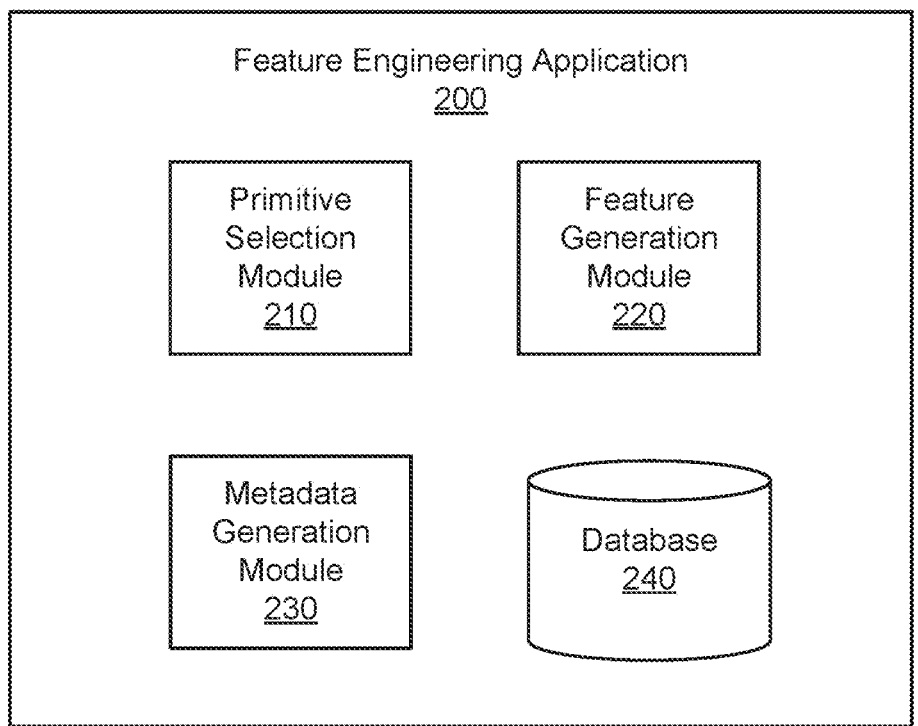
FIG. 2 is a block diagram illustrating a more detailed view of a feature engineering application of the machine learning server according to one embodiment.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

FIG. 1 is a block diagram illustrating a machine learning environment 100 including a machine learning server 110 according to one embodiment. The environment 100 further includes multiple data sources 120 connected to the machine learning server 110 via a network 130. Although the illustrated environment 100 contains only one machine learning server 110 coupled to multiple data sources 120, embodiments can have multiple machine learning servers and a singular data source.

The data sources 120 provide electronic data to the machine learning server 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. The data sources 120 may be remote from the machine learning server 110 and provide the data via the network 130. In addition, some or all data sources 120 may be directly coupled to the data analytics system and provide the data without passing the data through the network 130.

The data provided by the data sources 120 may be organized into data records (e.g., rows). Each data record includes one or more values. For example, a data record provided by a data source 120 may include a series of comma-separated values. The data describe information of relevance to an enterprise using the machine learning server 110. For example, data from a data source 120 can describe computer-based interactions (e.g., click tracking data) with content accessible on websites and/or with applications. As another example, data from a data source 120 can describe customer transactions online and/or in stores. The enterprise can be in one or more of various industries, such as manufacturing, sales, financing, and banking.

The machine learning server 110 is a computer-based system utilized for constructing machine learning models and providing the machine learning models to make predictions based on data. Example predictions include whether or not a customer will make a transaction within a time period, whether or not a transaction is fraudulent, whether or not a user will perform a computer-based interaction, etc. The data are collected, gathered, or otherwise accessed from one or more of the multiple data sources 120 via the network 130. The machine learning server 110 can implement scalable software tools and hardware resources employed in accessing, preparing, blending, and analyzing data from a wide variety of data sources 120. The machine learning server 110 can be a computing device used to implement machine learning functions including feature engineering and modeling techniques described herein.

The machine learning server 110 can be configured to support one or more software applications, illustrated in FIG. 1 as a feature engineering application 140 and a modeling application 150. The feature engineering application 140 performs automated feature engineering, in which it extracts predictor variables, i.e., features, from data provided by a data source 120 (e.g., temporal and relational datasets). Each feature is a variable that is potentially relevant to a prediction (referred to as target prediction) that the corresponding machine learning model will be used to make.

In one embodiment, the feature engineering application 140 selects primitives from a pool of primitives based on the data. The pool of primitives is maintained by the feature engineering application 140. A primitive defines an individual computation that can be applied to raw data in a dataset to create one or more new features having associated values. The selected primitives can be applied across different kinds of datasets and stacked to create new calculations, as they constrain the input and output data types. The feature engineering application 140 synthesizes features by applying the selected primitives to the data provided by the data source. It then evaluates the features to determine the importance of respective features through an iterative process in which it applies a different portion of the data to the features in each iteration. The feature engineering application 140 removes some of the features in each iteration to obtain a subset of features that are more useful for the prediction than removed features.

For each feature in the subset, the feature engineering application 140 determines an importance factor, e.g., by using random forests. The importance factor indicates how important/relevant the feature is to the target prediction. The features in the subset and their importance factors can be sent to the modeling application 150 to build a machine learning model.

One advantage of the feature engineering application 140 is that the use of primitives makes the feature engineering process more efficient than conventional feature engineering processes, in which features are extracted from raw data. Also, the feature engineering application 140 can evaluate a primitive based on the evaluation and importance factor of the feature(s) generated from the primitive. It can generate metadata describing the evaluation of the primitives and use the metadata to determine whether to select the primitive for different data or a different prediction problem. Conventional feature engineering processes could generate a great number of features (such as millions) without providing any guidance or solutions to engineer features faster and better. Another advantage of the feature engineering application 140 is that it does not require a large amount of data to evaluate the feature. Rather, it applies an iterative method to evaluate the features, where it uses a different portion of the data in each iteration.

The feature engineering application 140 can provide a graphical user interface (GUI) that allows users to contribute to the feature engineering process. As an example, a GUI associated with the feature engineering application 140 offers a feature selection tool that allows users to edit the features selected by the feature engineering application 140. It can also offer options for users to specify which variables to consider and modify characteristics of features, such as maximum allowed depth of features, maximum number of generated features, a date range for data to be included (e.g., specified by a cutoff time), etc. More details about the feature engineering application 140 are described in conjunction with FIGS. 2-4.

The modeling application 150 trains a machine learning model with the features and the importance factors of the features that are received from the feature engineering application 140. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The generated machine learning model, when applied to the features extracted from a new dataset (e.g., a dataset from the same or a different data source 120), makes the target prediction. A new dataset may miss one or more features, which can still be included with a null value. In some embodiments, the modeling application 150 applies dimensionality reduction (e.g., via linear discriminant analysis (LDA), principle component analysis (PCA), or the like) to reduce the amount of data in the features of a new dataset to a smaller, more representative set of data.

In some embodiments, the modeling application 150 validates predictions before deploying to the new dataset. For example, the modeling application 150 applies the trained model to a validation dataset to quantify the accuracy of the model. Common metrics applied in accuracy measurement include: Precision=TP/(TP+FP) and Recall=TP/(TP+FN), where precision is how many outcomes the model correctly predicted (TP or true positives) out of the total it predicted (TP+FP or false positives), and recall is how many outcomes the model correctly predicted (TP) out of the total number that actually occurred (TP+FN or false negatives). The F score (F-score=2*PR/(P+R)) unifies precision and recall into a single measure. In one embodiment, the modeling application 150 iteratively re-trains the machine learning model until the occurrence of a stopping condition, such as the accuracy measurement indication that the machine learning model is sufficiently accurate, or a number of training rounds having taken place.

In some embodiments, the modeling application 150 tunes the machine learning model for a particular business need. For example, the modeling application 150 builds a machine learning model to recognize fraudulent financial transactions and tunes the model to emphasize fraudulent transactions that are more important (e.g., high-value transactions) to reflect the needs of the enterprise, e.g., by transforming predicted probabilities in a way that highlights the more important transactions. More details about the modeling application 150 are described in conjunction with FIG. 5.

The network 130 represents the communication pathways between the machine learning server 110 and data sources 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

FIG. 2 is a block diagram illustrating a feature engineering application 200 according to one embodiment. The feature engineering application 200 is an embodiment of the feature engineering application 140 in FIG. 1. The feature engineering application 200 includes a primitive selection module 210, a feature generation module 220, a metadata generation module 230, and a database 240. The feature engineering application 200 receives a dataset from a data source 120 and generates a machine learning model based on the dataset. Those of skill in the art will recognize that other embodiments can have different and/or other components than the ones described here, and that the functionalities can be distributed among the components in a different manner.

The primitive selection module 210 selects one or more primitives from a pool of primitives maintained by the feature engineering application 200. The pool of primitives includes a large number of primitives, such as hundreds or thousands of primitives. Each primitive comprises an algorithm that when applied to data, performs a calculation on the data and generates a feature having an associated value. A primitive is associated with one or more attributes. An attribute of a primitive may be a description of the primitive (e.g., a natural language description specifying a calculation performed by the primitive when it is applied to data), input type (i.e., type of input data), return type (i.e., type of output data), metadata of the primitive that indicates how useful the primitive was in previous feature engineering processes, or other attributes.

In some embodiments, the pool of primitives includes multiple different types of primitives. One type of primitive is an aggregation primitive. An aggregation primitive, when applied to a dataset, identifies related data in the dataset, performs a determination on the related data, and creates a value summarizing and/or aggregating the determination. For example, the aggregation primitive "count" identifies the values in related rows in the dataset, determines whether each of the values is a non-null value, and returns (outputs) a count of the number of non-null values in the rows of the dataset. Another type of primitive is a transformation primitive. A transformation primitive, when applied to the dataset, creates a new variable from one or more existing variables in the dataset. For example, the transformation primitive "weekend" evaluates a timestamp in the dataset and returns a binary value (e.g., true or false) indicating whether the date indicated by the timestamp occurs on a weekend. Another exemplary transformation primitive evaluates a timestamp and returns a count indicating the number of days until a specified date (e.g., number of days until a particular holiday).

The primitive selection module 210 selects a set of primitives based on a dataset received from a data source, such as one of the data sources 120 in FIG. 1. In some embodiments, the primitive selection module 210 uses a skim view approach, a summary view approach, or both approaches to select primitives. In the skim view approach, the primitive selection module 210 identifies one or more semantic representations of the dataset. A semantic representation of the dataset describes a characteristic of the dataset and may be obtained without performing calculations on data in the dataset. Examples of semantic representations of the dataset include the presence of one or more particular variables (e.g., a name of a column) in the dataset, a number of columns, a number of rows, an input type of the dataset, other attributes of the dataset, and some combination thereof. To select a primitive using a skim view approach, the primitive selection module 210 determines whether an identified semantic representation of the dataset matches an attribute of a primitive in the pool. If there is a match, the primitive selection module 210 selects the primitive.

The skim view approach is a rule-based analysis. The determination of whether an identified semantic representation of the dataset matches an attribute of a primitive is based on rules maintained by the feature engineering application 200. The rules specify which semantic representations of dataset match which attributes of primitive, e.g., based on matching of key words in semantic representations of dataset and in attributes of primitive. In one example, a semantic representation of the dataset is a column name "date of birth", the primitive selection module 210 selects a primitive whose input type is "date of birth," which matches the semantic representation of the dataset. In another example, a semantic representation of the dataset is a column name "timestamp," the primitive selection module 210 selects a primitive having an attribute indicating the primitive is appropriate for use with data indicating a timestamp.

In the summary view approach, the primitive selection module 210 generates a representative vector from the dataset. The representative vector encodes data describing the dataset, such as data indicating number of tables in the dataset, number of columns per table, average number of each column, and average number of each row. The representative vector thus serves as a fingerprint of the dataset. The fingerprint is a compact representation of the dataset and may be generated by applying one or more fingerprint functions, such as hash functions, Rabin's fingerprinting algorithm, or other types of fingerprint functions to the dataset.

The primitive selection module 210 selects primitives for the dataset based on the representative vector. For instance, the primitive selection module 210 inputs the representative vector of the dataset into a machine learned model. The machine learned model outputs primitives for the dataset. The machine learned model is trained, e.g., by the primitive selection module 210, to select primitives for datasets based on representative vectors. It may be trained based on training data that includes a plurality of representative vectors of a plurality of training datasets and a set of primitives for each of the plurality of training datasets. The set of primitives for each of the plurality of training datasets have been used to generate features determined useful for making a prediction based on the corresponding training dataset. In some embodiments, the machine learned model is continuously trained. For example, the primitive selection module 210 can further train the machine learned model based on the representative vector of the dataset and at least some of the selected primitives.

The primitive selection module 210 can provide the selected primitives for display to a user (e.g., a data analytics engineer) in the GUI supported by the feature engineering application 200. The GUI may also allow the user edit primitives, such as add other primitives to the set of primitives, create new primitives, remove selected primitives, other types of actions, or some combination thereof.

The feature generation module 220 generates a group of features and an importance factor for each feature in the group. In some embodiments, the feature generation module 220 synthesizes a plurality of features based on the selected primitives and the dataset. In some embodiments, the feature generation module 220 applies each of the selected primitives to at least a portion of the dataset to synthesize one or more features. For instance, the feature generation module 220 applies a "weekend" primitive to a column named "timestamp" in the dataset to synthesize a feature indicating whether or not a date occurs on a weekend. The feature generation module 220 can synthesize a large number of features for the dataset, such as hundreds or even millions of features.

The feature generation module 220 evaluates the features and removes some of the features based on the evaluation to obtain the group of features. In some embodiments, the feature generation module 220 evaluates the features through an iterative process. In each round of the iteration, the feature generation module 220 applies the features that were not removed by previous iterations (also referred to as "remaining features") to a different portion of the dataset and determines a usefulness score for each of the features. The feature generation module 220 removes some features that have the lowest usefulness scores from the remaining features. In some embodiments, the feature generation module 220 determines the usefulness scores of features by using random forests.

After the iteration is done and the group of features are obtained, the feature generation module 220 determines an importance factor for each feature in the group. The importance factor of a feature indicates how important the feature is for predicting the target variable. In some embodiments, the feature generation module 220 determines importance factors by using a random forest, e.g., one constructed based on at least a portion of the dataset. In some embodiments, the feature generation module 220 adjusts the importance score of a feature by inputting the feature and a different portion of the dataset into the machine learning model. The machine learning model outputs a second importance score of the feature. The feature generation module 220 compares the importance factor with the second importance score to determine whether to adjust the importance factor. For example, the feature generation module 220 can change the importance factor to an average of the importance factor and the second importance factor.

The feature generation module 220 then sends the groups of features and their importance factor to a modeling application, e.g., the modeling application 150, to train a machine learning model.

In some embodiments, the feature generation module 220 may generate additional features based on an incremental approach. For instance, the feature generation module 220 receives new primitives added by the user through the primitive selection module 210, e.g., after the groups of features are generated and their importance factors are determined. The feature generation module 220 generates the additional features, evaluates the additional features, and/or determines importance factors of the additional features based on the new primitives without changing the group of features that had been generate and evaluated.

The metadata generation module 230 generates metadata associated with the primitives that are used to synthesize the features in the group. The metadata of a primitive indicates how useful the primitive is for the dataset. The metadata generation module 230 may generate the metadata of the primitive based on a usefulness score and/or the importance factor of the feature generated from the primitive. The metadata can be used by the primitive selection module 210 in subsequent feature engineering processes to select primitives for other datasets and/or different predictions. The metadata generation module 230 can retrieve the representative vectors of the primitives that were used to synthesize the features in the group and feed the representative vectors and the primitives back into the machine learned model used for selecting primitives based on representative vectors to further train the machine learned model.

In some embodiments, the metadata generation module 230 generates natural language description of the features in the group. The natural language description of a feature includes information that describes attributes of the feature, such as algorithms included in the feature, results of applying the feature to data, function of the feature, and so on.

The database 240 stores data associated with the feature engineering application 200, such as data received, used, and generated by the feature engineering application 200. For instance, the database 240 stores the dataset received from the data source, primitives, features, importance factors of features, random forests used for determining usefulness scores of features, machine learning models for selecting primitives and for determining importance factors of features, metadata generated by the metadata generation module 230, and so on.

Figure 3:
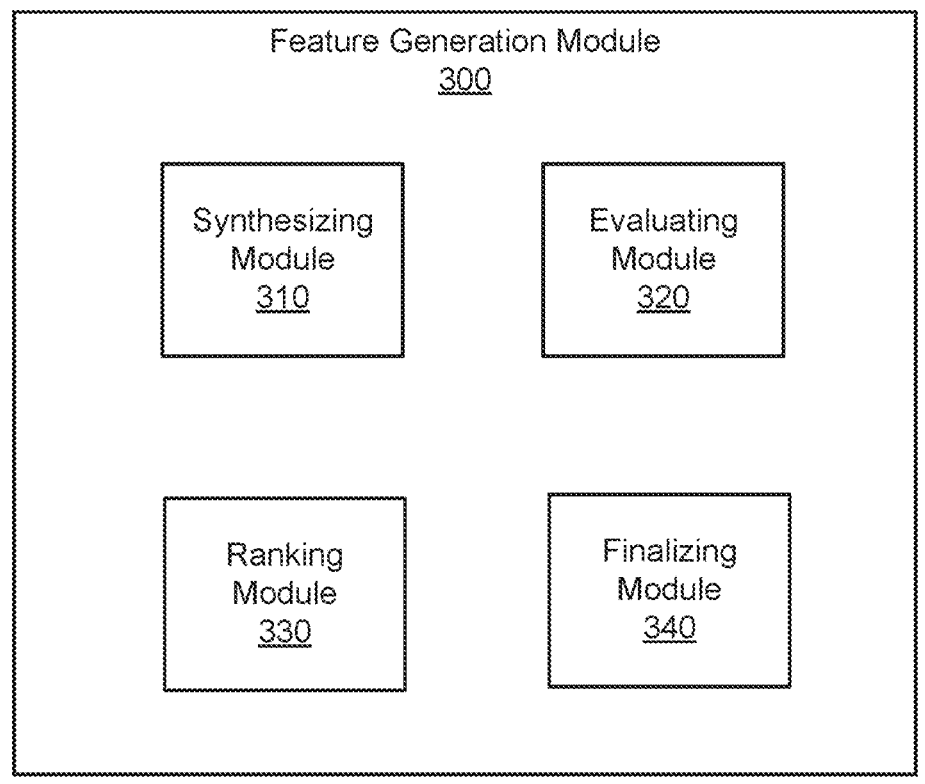
FIG. 3 is a block diagram illustrating a more detailed view of a feature generation module of the feature engineering application according to one embodiment.

FIG. 3 is a block diagram illustrating a feature generation module 300 according to one embodiment. The feature generation module 300 is an embodiment of the feature generation module 220 in FIG. 2. It generates features based on a dataset for training a machine learning model. The feature generation module 300 includes a synthesizing module 310, an evaluating module 320, a ranking module 330, and a finalizing module 340. Those of skill in the art will recognize that other embodiments can have different and/or other components than the ones described here, and that the functionalities can be distributed among the components in a different manner.

The synthesizing module 310 synthesizes a plurality of features based on the dataset and primitives selected for the dataset. For each primitive, the synthesizing module 310 identifies a portion of the dataset, e.g., one or more columns of the dataset. For example, for a primitive having an input type of date of birth, the synthesizing module 310 identifies the data of birth column in the dataset. The synthesizing module 310 applies the primitive to the identified column to generate the feature for each row of the column. The synthesizing module 310 can generate a large number of features for the dataset, such as hundreds or even millions.

The evaluating module 320 determines usefulness scores of the synthesized features. A usefulness score of a feature indicates how useful the feature is for a prediction made based on the dataset. In some embodiments, the evaluating module 320 iteratively applies a different portion of the dataset to the features to evaluate usefulness of the features. For instance, in the first iteration, the evaluating module 320 applies a predetermined percentage (such as 25%) of the dataset to the features to construct a first random forest. The first random forest includes a number of decision trees. Each decision tree includes a plurality of nodes. Every node corresponds to a feature and is includes a condition describing how to transit the tree through the node based on the value of the feature (e.g., take one branch if a date occurs on a weekend, and take another branch if not). The feature for each node is decided based on information gain or Gini impurity reduction. The feature that maximizes the information gain or reduction in Gini impurity is selected as the splitting feature. The evaluating module 320 determines an individual usefulness score of the feature based on either the information gain or reduction in Gini impurity due to the feature across the decision tree. The individual usefulness score of the feature is specific to one decision tree. After determining the individual usefulness scores of the feature for each of the decision trees in the random forest, the evaluating module 320 determines a first usefulness score of the feature by combining the individual usefulness scores of the feature. In one example, the first usefulness score of the feature is an average of the individual usefulness scores of the feature. The evaluating module 320 removes 20% of the features, which have the lowest first usefulness scores, so that 80% of the features are remaining. These features are referred to as the first remaining features.

In the second iteration, the evaluating module 320 applies the first remaining features to a different portion of the dataset. The different portion of the dataset can be 25% of the dataset that is different from the portion of the dataset used in the first iteration, or it can be 50% of the dataset that includes the portion of the dataset used in the first iteration. The evaluating module 320 constructs a second random forest using the different portion of the dataset and determines a second usefulness score for each of the remaining feature by using the second random forest. The evaluating module 320 removes 20% of the first remaining features and the rest of the first remaining features (i.e., 80% of the first remaining features form the second remaining features).

Similarly, in each following iteration, the evaluating module 320 applies the remaining features from the previous round to a different portion of the dataset, determines usefulness scores of the remaining features from the previous round, and removes some of the remaining features to obtain a smaller group of features.

The evaluating module 320 can continue the iterative process until it determines that a condition is met. The condition can be that under a threshold number of features remain, the lowest usefulness score of the remaining features is above a threshold, the whole dataset has been applied to the features, a threshold number of rounds have been completed in the iteration, other conditions, or some combination thereof. The remaining features of the last round, i.e., features not removed by the evaluating module 320, are selected to train a machine learning model.

The ranking module 330 ranks the selected features and determines an importance score for each selected feature. In some embodiments, the ranking module 330 constructs a random forest based on the selected features and the dataset. The ranking module 330 determines an individual ranking score of a selected feature based on each decision tree in the random forest and obtains an average of the individual ranking scores as the ranking score of the selected feature. The ranking module 330 determines importance factors of the selected features based on their ranking scores. For instance, the ranking module 330 ranks the selected features based on their ranking scores and determines that the importance score of the highest ranked selected feature is 1. The ranking module 330 then determines a ratio of the ranking score of each of the rest of the selected features to the ranking score of the highest ranked selected feature as the importance factor of the corresponding selected feature.

The finalizing module 340 finalizes the selected features. In some embodiments, the finalizing module 340 re-ranks the selected features to determine a second ranking score for each of the selected features. In response to a determination that the second ranking score of a feature is different from its initial ranking score, the finalizing module 340 can remove the feature from the group, generate metadata for the feature indicating uncertainty in the importance of the feature, warn the end-user of the inconsistence and uncertainty, etc.

FIG. 4 is a flow chart illustrating a method 400 of generating a machine learning model according to one embodiment. In some embodiments, the method is performed by the feature engineering application 140, although some or all of the operations in the method may be performed by other entities in other embodiments. In some embodiments, the operations in the flow chart are performed in different orders and include different and/or additional steps.

The feature engineering application 140 receives 410 a dataset from a data source, e.g., one of the data sources 120.

The feature engineering application 140 selects 420 primitives from a pool of primitives based on the received dataset. Each of the selected primitives is configured to be applied to at least a portion of the dataset to synthesize one or more features. In some embodiments, the feature engineering application 140 selects a primitive by generating a semantic representation of the dataset and selecting primitives associated with attributes matching the semantic representation of the dataset. Additionally or alternatively, the feature engineering application 140 generates a representative vector of the dataset and inputs the representative vector into a machine learned model. The machine learned model outputs the selected primitives based on the vector.

The feature engineering application 140 synthesizes 430 a plurality of features based on the selected primitives and the received dataset. The feature engineering application 140 applies each of the selected primitives to a related portion of the dataset to synthesize the features. For instance, for each selected primitive, the feature engineering application 140 identifies one or more variables in the dataset and applies the primitive to the variables to generate features.

The feature engineering application 140 iteratively evaluates 440 the plurality of features to remove some features from the plurality of features to obtain a subset of features. In each iteration, the feature engineering application 140 evaluates usefulness of at least some features of the plurality of features by applying a different portion of the dataset to the evaluated features and removes some of the evaluated features based on the usefulness of the evaluated features.

The feature engineering application 140 determines 450 an importance factor for each feature of the subset of features. In some embodiments, the feature engineering application 140 constructs a random forest based on the subset of features and at least a portion of the dataset to determine the importance factors of the subset of features.

The feature engineering application 140 generates 460 a machine learning model based on the subset of features and the importance factor of each feature of the subset of features. The machine learning model is configured to be used to make a prediction based on new data.

Figure 5:
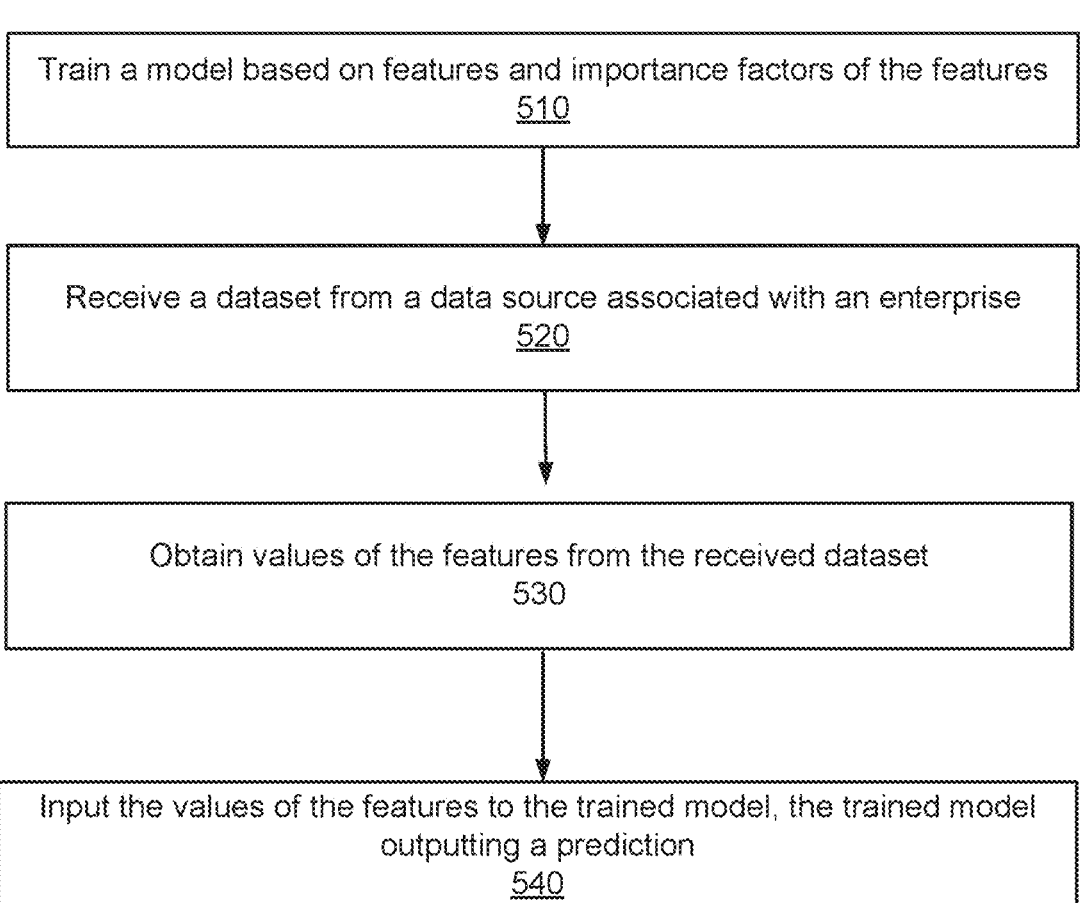
FIG. 5 is a flow chart illustrating a method of training a machine learning model and using the trained model to make a prediction according to one embodiment.

FIG. 5 is a flow chart illustrating a method 500 of training a machine learning model and using the trained model to make a prediction according to one embodiment. In some embodiments, the method is performed by the modeling application 150, although some or all of the operations in the method may be performed by other entities in other embodiments. In some embodiments, the operations in the flow chart are performed in different orders and include different and/or additional steps.

The modeling application 150 trains 510 a model based on features and importance factors of the features. In some embodiments, the features and importance factors are generated by the feature engineering application 140, e.g., by using the method 400 described above. The modeling application 150 may use different machine learning techniques in different embodiments. Example machine learning techniques include such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, and so on.

The modeling application 150 receives 520 a dataset from a data source (e.g., a data source 120) that is associated with an enterprise. The enterprise can be in one or more of various industries, such as manufacturing, sales, financing, and banking. In some embodiments, the modeling application 150 tunes the trained model for a particular industry need. For example, the trained model is to recognize fraudulent financial transactions, the modeling application 150 tunes the trained model to emphasize fraudulent transactions that are more important (e.g., high-value transactions) to reflect the needs of the enterprise, e.g., by transforming predicted probabilities in a way that highlights the more important transactions.

The modeling application 150 obtains 530 values of the features from the received dataset. In some embodiments, the modeling application 150 retrieves the values of a feature from the dataset, e.g., in embodiments where the feature is a variable included in the dataset. In some embodiments, the modeling application 150 obtains the values of a feature by applying the primitive that was used to synthesize the feature to the dataset.

The modeling application 150 inputs 540 the values of the features to the trained model. The trained model outputs a prediction. The prediction may be a prediction of whether a customer will make a transaction within a time period, whether a transaction is fraudulent, whether a user will perform a computer-based interaction, etc.

Figure 6:
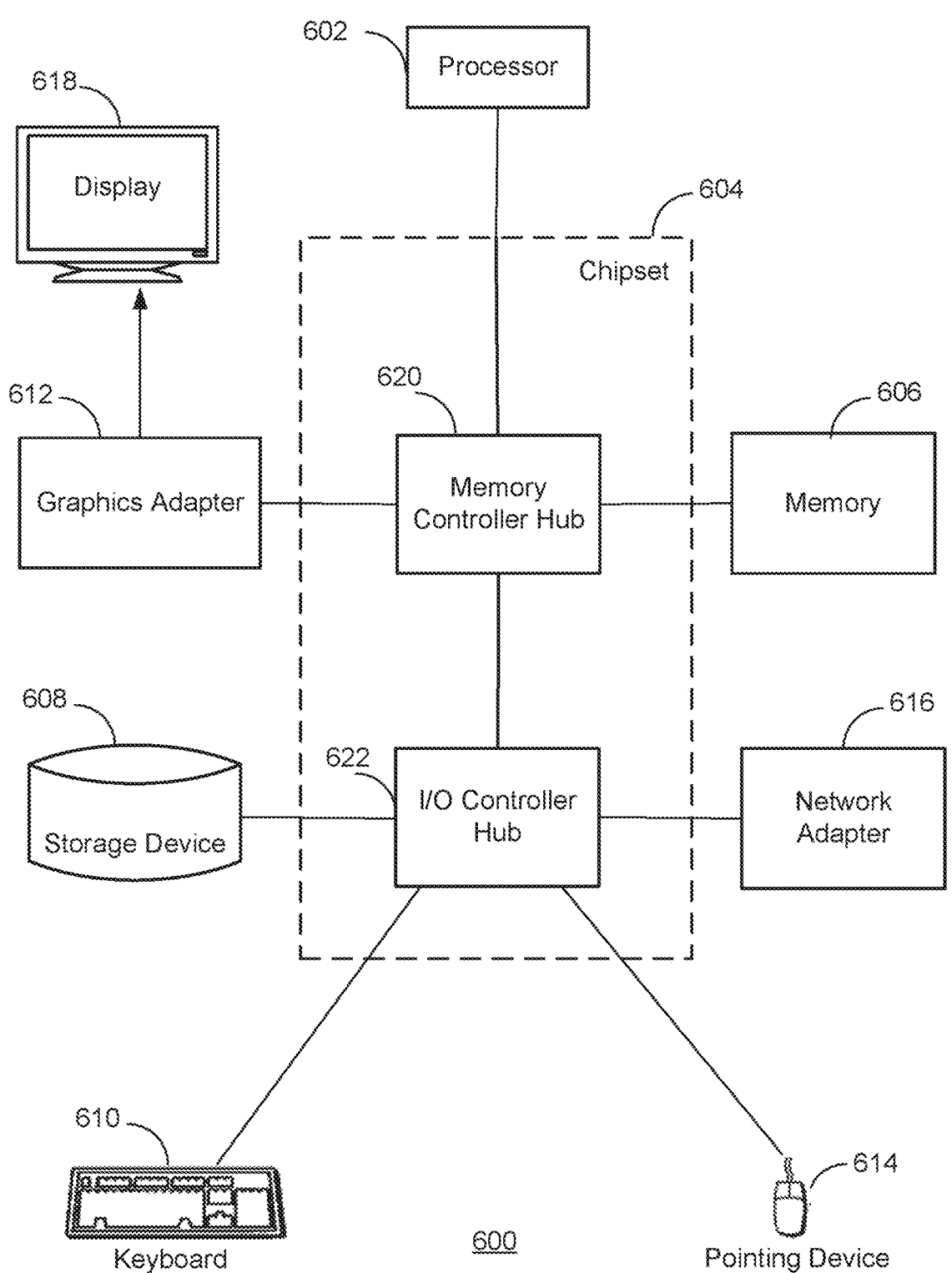
FIG. 6 is a high-level block diagram illustrating a functional view of a typical computer system for use as the machine learning server of FIG. 1 according to an embodiment.

FIG. 6 is a high-level block diagram illustrating a functional view of a typical computer system 600 for use as the machine learning server 110 of FIG. 1 according to an embodiment.

The illustrated computer system includes at least one processor 602 coupled to a chipset 604. The processor 602 can include multiple processor cores on the same die. The chipset 604 includes a memory controller hub 620 and an input/output (I/O) controller hub 622. A memory 606 and a graphics adapter 612 are coupled to the memory controller hub 620 and a display 618 is coupled to the graphics adapter 612. A storage device 608, keyboard 610, pointing device 614, and network adapter 616 may be coupled to the I/O controller hub 622. In some other embodiments, the computer system 600 may have additional, fewer, or different components and the components may be coupled differently. For example, embodiments of the computer system 600 may lack displays and/or keyboards. In addition, the computer system 600 may be instantiated as a rack-mounted blade server or as a cloud server instance in some embodiments.

The memory 606 holds instructions and data used by the processor 602. In some embodiments, the memory 606 is a random-access memory. The storage device 608 is a non-transitory computer-readable storage medium. The storage device 608 can be a HDD, SSD, or other types of non-transitory computer-readable storage medium. Data processed and analyzed by the machine learning server 110 can be stored in the memory 606 and/or the storage device 608.

The pointing device 614 may be a mouse, track ball, or other type of pointing device, and is used in combination with the keyboard 610 to input data into the computer system 600. The graphics adapter 612 displays images and other information on the display 618. In some embodiments, the display 618 includes a touch screen capability for receiving user input and selections. The network adapter 616 couples the computer system 600 to the network 160.

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:
1. A method comprising:
receiving a dataset from a data source;

receiving a plurality of primitives, each of the plurality of primitives comprising a computation that, when applied to the dataset, creates at least one feature having at least one associated value;

selecting a subset of primitives from the plurality of primitives by generating a fingerprint representation for the dataset and inputting the fingerprint representation to a machine learning model trained to output primitives based on an input fingerprint representation, the fingerprint representation encoding a number of tables included in the dataset and a number of columns per table included in the dataset;

synthesizing a plurality of features by applying the subset of primitives to the dataset;

obtaining a subset of features from the plurality of features, the subset of features being obtained by evaluating the plurality of features during a plurality of iterations, each of the plurality of iterations comprising:
determining a first usefulness score based on a first portion of the dataset;
determining a second usefulness score based on a second portion of the dataset; and
removing at least one of the plurality of features from the subset of features based on the first usefulness score and the second usefulness score; and generating a predictive computational model based on the subset of features, the predictive computational model configured to make a prediction based on new data.

2. The method of claim 1, wherein the at least one feature having the at least one associated value created by the computation of a primitive in the plurality of primitives is a new feature that is not included in the dataset.

3. The method of claim 1, wherein selecting the subset of primitives from the plurality of primitives based on the dataset further comprises inputting the fingerprint representation into a second machine learning model, the second machine learning model outputting the subset of primitives based on the fingerprint representation.

4. The method of claim 1, wherein obtaining a subset of features from the plurality of features is further performed based on an importance factor for at least one feature in the plurality of features.

5. The method of claim 4, further comprising determining the importance factor for the at least one feature in the plurality of features by:
ranking the plurality of features by inputting the plurality of features and a portion of the dataset into a ranking model trained to output a ranking score for each of the plurality of features; and
determining the importance factor for the at least one feature in the plurality of features based on a corresponding ranking score output by the ranking model.

6. The method of claim 1, wherein removing the at least one of the plurality of features from the subset of features based on the first usefulness score and the second usefulness score comprises:
generating a first subset of features by removing one or more of the first of features based on the first usefulness score; and
removing one or more features from the first subset of features based on the second usefulness score.

7. The method of claim 1, wherein selecting the subset of primitives from the plurality of primitives further comprises:
generating a semantic representation of the dataset; and
selecting primitives from the plurality of primitives having attributes matching the semantic representation of the dataset.

8. The method of claim 1, wherein the fingerprint representation for the dataset comprises a vector representation of the dataset.

9. The method of claim 8, wherein selecting the subset of primitives from the plurality of primitives comprises generating a corresponding vector representation for each of the plurality of primitives and comparing the vector representation of the dataset to the corresponding vector representation for each of the plurality of primitives.

10. The method of claim 1, wherein the fingerprint representation for the dataset encodes an average number of each column in a table of the dataset.

11. The method of claim 1, wherein the fingerprint representation for the dataset encodes an average number of each row in a table of the dataset.

12. A system comprising:

one or more processors; and a computer-readable storage medium storing instructions that are executable by the one or more processors to:

receive a dataset from a data source;

receive a plurality of primitives, each of the plurality of primitives comprising a computation that, when applied to the dataset, creates at least one feature having at least one associated value;

select a subset of primitives from the plurality of primitives by generating a fingerprint representation for the dataset and inputting the fingerprint representation to a machine learning model trained to output primitives based on an input fingerprint representation, the fingerprint representation encoding a number of tables included in the dataset and a number of columns per table included in the dataset;

synthesize a plurality of features by applying the subset of primitives to the dataset;

obtain a subset of features from the plurality of features, the subset of features being obtained by evaluating the plurality of features during a plurality of iterations, each of the plurality of iterations comprising:

determining a first usefulness score based on a first portion of the dataset;

determining a second usefulness score based on a second portion of the dataset; and removing at least one of the plurality of features from the subset of features based on the first usefulness score and the second usefulness score; and generate a predictive computational model based on the subset of features, the predictive computational model configured to make a prediction based on new data.

13. The system of claim 12, wherein the at least one feature having the at least one associated value created by the computation of a primitive in the plurality of primitives is a new feature that is not included in the dataset.

14. The system of claim 12, wherein the system is configured to select the subset of primitives from the plurality of primitives based on the dataset by inputting the fingerprint representation into a second machine learning model, wherein the second machine learning model is trained to the subset of primitives based on the fingerprint representation.

15. The system of claim 12, wherein the system is configured to remove the at least one of the plurality of features from the subset of features based on the first usefulness score and the second usefulness score by:

generating a first subset of features by removing one or more of the plurality of features based on the first usefulness score; and removing one or more features from the first subset of features based on the second usefulness score.

16. The system of claim 12, wherein selecting the subset of primitives from the plurality of primitives further comprises:

generating a semantic representation of the dataset; and selecting primitives from the plurality of primitives having attributes matching the semantic representation of the dataset.

17. The system of claim 12, wherein the fingerprint representation for the dataset further encodes at least one of:

an average number of each column in a table of the dataset; or an average number of each row in a table of the dataset.

18. A non-transitory computer-readable storage medium storing instructions that are executable by at least one processing device to perform operations comprising:

receiving a dataset from a data source;

receiving a plurality of primitives, each of the plurality of primitives comprising a computation that, when applied to the dataset, creates at least one feature having at least one associated value;

selecting a subset of primitives from the plurality of primitives by generating a fingerprint representation for the dataset and inputting the fingerprint representation to a machine learning model trained to output primitives based on an input fingerprint representation, the fingerprint representation encoding a number of tables included in the dataset and a number of columns per table included in the dataset;

synthesizing a plurality of features by applying the subset of primitives to the dataset;

obtaining a subset of features from the plurality of features, the subset of features being obtained by evaluating the plurality of features during a plurality of iterations, each of the plurality of iterations comprising:

determining a first usefulness score based on a first portion of the dataset;

determining a second usefulness score based on a second portion of the dataset; and removing at least one of the plurality of features from the subset of features based on the first usefulness score and the second usefulness score; and generating a predictive computational model based on the subset of features, the predictive computational model configured to make a prediction based on new data.

19. The non-transitory computer-readable storage medium of claim 18, wherein the at least one feature having the at least one associated value created by the computation of a primitive in the plurality of primitives is a new feature that is not included in the dataset.

20. The non-transitory computer-readable storage medium of claim 18, wherein obtaining a subset of features from the plurality of features is further performed based on an importance factor for at least one feature in the plurality of features.

\* \* \* \* \*